US011867245B2

(12) United States Patent
Usui (10) Patent No.: US 11,867,245 B2
(45) Date of Patent: Jan. 9, 2024

(54) ELECTRIC PARKING BRAKE DEVICE

(71) Applicant: NISSIN KOGYO CO., LTD., Tomi (JP)

(72) Inventor: Koji Usui, Tomi (JP)

(73) Assignee: Hitachi Astemo Ltd., Ibaraki (JP)

( * ) Notice: Subject to any disclaimer, the term of this patent is extended or adjusted under 35 U.S.C. 154(b) by 125 days.

(21) Appl. No.: 16/754,344

(22) PCT Filed: Oct. 18, 2018

(86) PCT No.: PCT/JP2018/038769
§ 371 (c)(1),
(2) Date: Apr. 7, 2020

(87) PCT Pub. No.: WO2019/078285
PCT Pub. Date: Apr. 25, 2019

(65) Prior Publication Data
US 2020/0309215 A1    Oct. 1, 2020

(30) Foreign Application Priority Data

Oct. 20, 2017    (JP) ................................. 2017-203219

(51) Int. Cl.
*F16D 65/22*    (2006.01)
*F16D 65/09*    (2006.01)
(Continued)

(52) U.S. Cl.
CPC .............. *F16D 65/22* (2013.01); *F16D 65/09* (2013.01); *F16D 2065/1348* (2013.01);
(Continued)

(58) Field of Classification Search
CPC .......... F16D 51/12; F16D 51/10; F16D 51/16; F16D 51/18; F16D 51/20; F16D 51/22;
(Continued)

(56) References Cited

U.S. PATENT DOCUMENTS

| 5,311,971 A | 5/1994 | Courbot |
| 9,175,737 B2 | 11/2015 | Bach et al. |

(Continued)

FOREIGN PATENT DOCUMENTS

| CN | 105083245 A | 11/2015 | |
| FR | 2482543 A1 * | 11/1981 | ............ B60T 11/046 |

(Continued)

OTHER PUBLICATIONS

Official Communication, extended European search report, dated Jun. 23, 2021, issued in the corresponding European Patent Application 18867477.4.

(Continued)

*Primary Examiner* — Nicholas J Lane
*Assistant Examiner* — Stephen M Bowes
(74) *Attorney, Agent, or Firm* — Carrier, Shende & Associates P.C.; Fulchand P. Shende; Joseph P. Carrier (57) ABSTRACT

Provided is an electric parking brake device in which an actuator case of an electric actuator is mounted to a backplate of a drum brake which includes a parking brake lever, with which electric actuator it is possible to obtain a parking brake state by pulling a brake cable linked with the parking brake lever. The backplate is formed with a through-hole for passing the brake cable and has a connecting tube portion integrally protruding therefrom and enclosing the through-hole. A mounting tube includes, on one end in an axial direction, a joint portion which is formed separately from the backplate and joined to the connecting tube portion. The actuator case is mounted to the mounting tube at certain axial and circumferential positions with respect to the (Continued)

mounting tube. This allows increased freedom of the mounting attitude of the electric actuator with respect to the backplate without increased cost.

14 Claims, 11 Drawing Sheets

(51) Int. Cl.
  *F16D 65/02* (2006.01)
  *F16D 121/24* (2012.01)
  *F16D 125/40* (2012.01)
  *F16D 125/64* (2012.01)
(52) U.S. Cl.
  CPC ...... *F16D 2121/24* (2013.01); *F16D 2125/40* (2013.01); *F16D 2125/64* (2013.01)
(58) Field of Classification Search
  CPC ............... F16D 2051/003; F16D 65/22; F16D 2125/40; F16D 2125/60; F16D 65/09; F16D 2125/64; F16F 2121/24; B60T 13/746
  See application file for complete search history.

(56) References Cited

U.S. PATENT DOCUMENTS

| | | | |
|---|---|---|---|
| 9,440,626 B2 | 9/2016 | Akada et al. | |
| 9,580,055 B2 | 2/2017 | Shin | |
| 2002/0014959 A1 | 2/2002 | Ludtke et al. | |
| 2016/0102720 A1* | 4/2016 | Bach | B60T 7/085 |
| | | | 188/327 |

FOREIGN PATENT DOCUMENTS

| | | | | |
|---|---|---|---|---|
| GB | 2231630 A | * | 11/1990 | ............ F16D 65/22 |
| JP | 2002310207 A | * | 10/2002 | |
| JP | 2013-124696 A | | 6/2013 | |
| JP | 2014-504711 A | | 2/2014 | |
| JP | 2016-176574 A | | 10/2016 | |
| KR | 2013-0123791 A | | 11/2013 | |

OTHER PUBLICATIONS

Official Communication issued over corresponding Chinese Patent Application No. 201880067817.7 dated Jan. 6, 2021.

\* cited by examiner

ELECTRIC PARKING BRAKE DEVICE

TECHNICAL FIELD

The invention relates to an electric parking brake device in which an actuator case of an electric actuator capable of obtaining a parking brake state by pulling a brake cable linked to a parking brake lever is mounted to a back plate of a drum brake having the parking brake lever.

BACKGROUND ART

There is a known electric parking brake device in which an actuator case of an electric actuator capable of obtaining a parking brake state is mounted to a back plate of a drum brake, as disclosed in, for example, PTL 1.

CITATION LIST

Patent Literature

PTL 1: JP-T-2014-504711

SUMMARY OF INVENTION

Technical Problem

In the electric parking brake device disclosed in PTL 1, an actuator case of an electric actuator is mounted to a back plate of a drum brake by tightening with a bolt. This reduces the freedom of the mounting attitude of the electric actuator with respect to the back plate, so a new component is required, or the mounting structure needs to be changed to change the mounting attitude according to the vehicle in which an electric parking brake device is installed, thereby causing an increase in cost.

The invention addresses such situations with an object of providing an electric parking brake device capable of increasing the freedom of the mounting attitude of an electric actuator with respect to a back plate of an electric actuator while avoiding an increase in cost.

Solution to Problem

To achieve the above object, according to a first aspect of the invention, there is provided an electric parking brake device in which an actuator case of an electric actuator capable of obtaining a parking brake state by pulling a brake cable linked to a parking brake lever is mounted to a back plate of a drum brake having the parking brake lever, in which a through-hole through which the brake cable passes is formed in the back plate, a connecting tube portion that surrounds the through-hole protrudes integrally, and the actuator case is mounted to a mounting tube having, at one end in an axial direction, a joint portion formed separately from the back plate and joined to the connecting tube portion at a certain axial and circumferential positions with respect to the mounting tube.

In a second aspect of the invention, in addition to the structure according to the first aspect, the joint portion is formed along a plane that obliquely intersects with an axial line of the mounting tube.

Advantageous Effects of Invention

According to the first aspect of the invention, since the joint portion at one end of the mounting tube to which the actuator case is mounted at certain axial and circumferential positions is joined to the connecting tube portion integrally provided in the back plate, the mounting attitude of the electric actuator with respect to the back plate can be easily changed by changing the relative circumferential position of the mounting tube with respect to the connecting tube portion and joining the joint portion to the connecting tube portion. Furthermore, the mounting tube may have a simple shape, variations of the mounting tube for individual vehicle types can be easily deployed, and an increase in cost can be avoided without necessity to prepare the back plate specific to each vehicle type.

In addition, according to the second aspect of the invention, since the joint portion is formed along the plane obliquely intersecting with the axial line of the mounting tube, the axial line of the mounting tube can be aligned in a direction obliquely intersecting with the connecting tube portion, the mounting direction of the electric actuator with respect to the back plate can be easily changed, and the freedom of the mounting attitude of the electric actuator with respect to the back plate can be further increased.

REFERENCE SIGNS LIST

11: drum brake
13: back plate
13a: connecting tube portion
34: parking brake lever
36: electric actuator
37: brake cable
39: actuator case
75: through-hole
77, 84: mounting tube
77a, 84a: joint portion
C: axial line of mounting tube
PL: plane

DESCRIPTION OF EMBODIMENTS

Embodiments of the invention will be described with reference to the attached drawings.

First Embodiment

A first embodiment of the invention will be described with reference to FIGS. 1 to 10. First, in FIGS. 1 to 3, a drum brake 11 is provided in, for example, a left rear wheel of a four-wheel vehicle and this drum brake 11 includes a fixed back plate 13 having, at the center thereof, a through-hole 12 through which a wheel shaft 10 of the left rear wheel passes, first and second brake shoes 15 and 16 disposed in the back plate 13 in slidable contact with the inner periphery of a brake drum 14 that rotates together with the left rear wheel, a wheel cylinder 17 fixed to the upper portion of the back plate 13 so as to generate a force that expands the first and second brake shoes 15 and 16, a braking clearance automatic adjustment means (so-called automatic adjuster) 18 that automatically adjusts a clearance between the first and second brake shoes 15 and 16 and the brake drum 14, and a return spring 19 provided between the first and second brake shoes 15 and 16.

Figure 1:
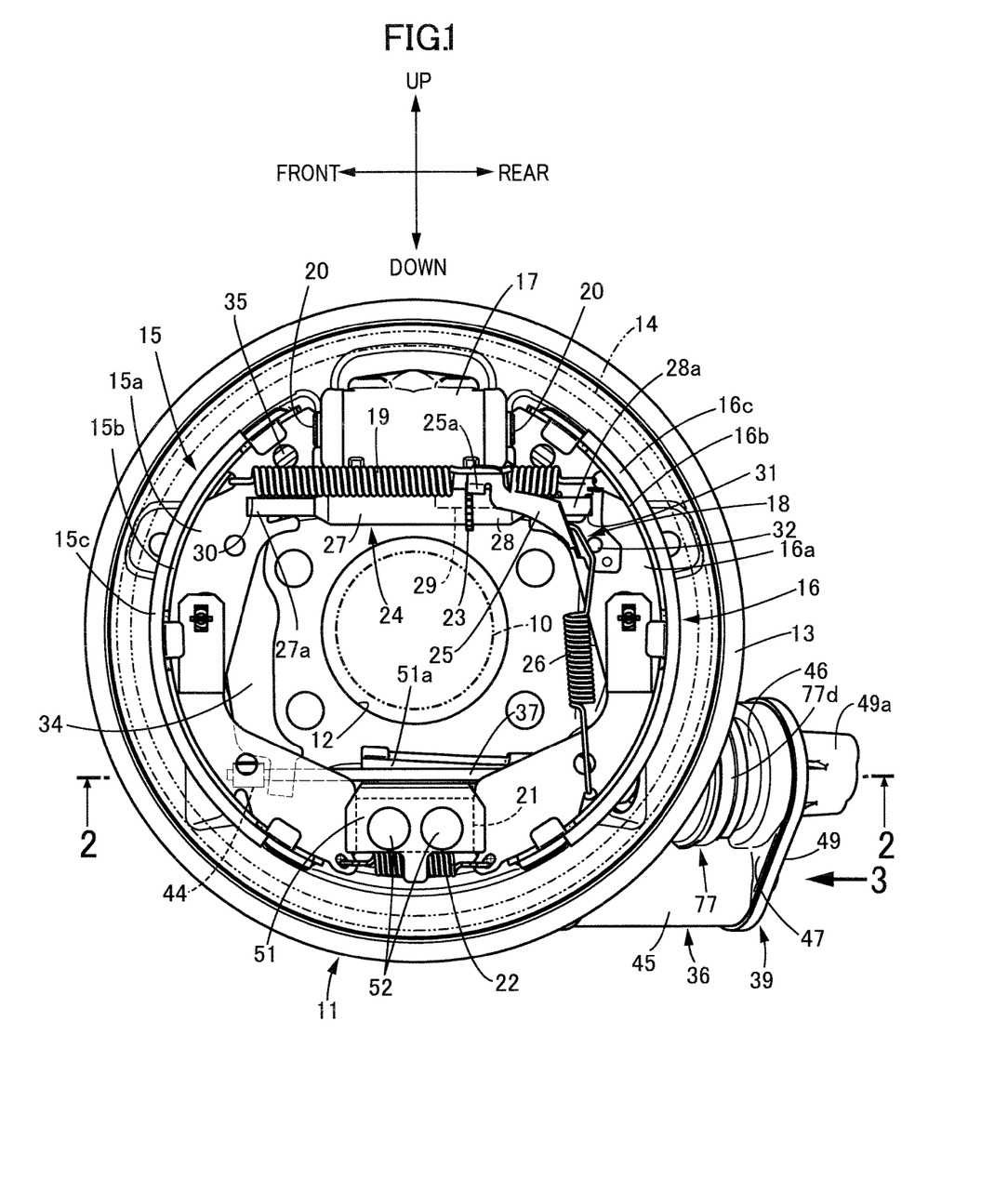
FIG. 1 is a front view illustrating a drum brake according to a first embodiment (first embodiment).

The first and second brake shoes 15 and 16 include webs 15a and 16a formed like bows along the inner periphery of the brake drum 14, rims 15b and 16b continuously provided orthogonally to the outer peripheries of the webs 15a and 16a, and linings 15c and 16c pasted to the outer peripheries of the rims 15b and 16b.

The outer ends of a pair of pistons 20 of the wheel cylinder 17 are disposed so as to face the webs 15a and 16a at the upper ends of the first and second brake shoes 15 and 16. In addition, an anchor block 21 that functions as the fulcrum when the first and second brake shoes 15 and 16 expand or contract is fixed to the lower portion of the back plate 13 so as to support one ends (lower ends in this embodiment) of the first and second brake shoes 15 and 16, and the wheel cylinder 17 is operated by the output hydraulic pressure of a master cylinder (not illustrated) operated by a brake pedal and generates a force that causes the first and second brake shoes 15 and 16 to expand using the anchor block 21 as the fulcrum.

A coil spring 22 that biases the lower ends of the webs 15a and 16a of the first and second brake shoes 15 and 16 toward the anchor block 21 is provided between the lower ends of the webs 15a and 16a, and the return spring 19 that biases the first and second brake shoes 15 and 16 toward contraction is provided between the upper ends of the webs 15a and 16a of the first and second brake shoes 15 and 16.

The braking clearance automatic adjustment means 18 includes a contraction position restricting strut 24 that is provided between the webs 15a and 16a of the first and second brake shoes 15 and 16 and expends due to the rotation of an adjustment gear 23, an adjustment lever 25 that has a feeding claw 25a to be engaged with the adjustment gear 23 and is rotatably supported by the web 16a of the second brake shoe 16, which is one of the first and second brake shoes 15 and 16, and an adjustment spring 26 that rotationally biases the adjustment lever 25 so as to rotate the adjustment gear 23 toward the expansion of the contraction position restricting strut 24.

The contraction position restricting strut 24 restricts the contraction positions of the first and second brake shoes 15 and 16. The contraction position restricting strut 24 includes a first rod 27 that has a first engagement portion 27a to be engaged with the upper portion of the web 15a of the first brake shoe 15 of the first and second brake shoes 15 and 16, a second rod 28 that has a second engagement portion 28a to be engaged with the upper portion of the web 16a of the second brake shoe 16 and is disposed concentrically with the first rod 27, and an adjustment bolt 29 having one end inserted into the first rod 27 in a relatively movable manner in the axial direction and the other end concentrically screwed with the second rod 28. The adjustment gear 23 is disposed between the first and second rods 27 and 28 and formed on the outer periphery of the adjustment bolt 29.

A first locking recess 30 to be engaged with the first engagement portion 27a is provided in the upper portion of the web 15a of the first brake shoe 15 and a second locking recess 31 to be engaged with the second engagement portion 28a is provided in the upper portion of the web 16a of the second brake shoe 16.

The adjustment lever 25 having the feeding claw 25a to be engaged with the adjustment gear 23 is rotatably supported by the web 16a of the second brake shoe 16 via a support shaft 32, and the adjustment spring 26 is provided between the web 16a of the second brake shoe 16 and the adjustment lever 25. Furthermore, the spring force of the adjustment spring 26 is set lower than the spring force of the return spring 19.

In the braking clearance automatic adjustment means 18 as described above, when the first and second brake shoes 15 and 16 expand due to the operation of the wheel cylinder 17, if the first and second brake shoes 15 and 16 expand by a certain amount or more due to wear of the linings 15c and 16c, the spring force of the adjustment spring 26 rotates the adjustment lever 25 about the axial line of the support shaft 32, and the adjustment gear 23 is thereby rotated to increase and correct the effective length of the contraction position restricting strut 24.

By the way, the drum brake 11 has one end pivotably supported by the web 15a of the first brake shoe 15 of the first and second brake shoes 15 and 16 and has a parking brake lever 34 to be engaged with one end of the contraction position restricting strut 24.

The parking brake lever 34 extends vertically so as to partially overlap with the web 15a of the first brake shoe 15 in front view, the upper end of this parking brake lever 34 is linked to the upper portion of the web 15a of the first brake shoe 15 via a pin 35, and the first engagement portion 27a of the contraction position restricting strut 24 is engaged with the upper portion of the parking brake lever 34.

When the parking brake of the vehicle operates, the parking brake lever 34 is rotated and driven counterclockwise in FIG. 1 about the pin 35 as the fulcrum. The rotation of this parking brake lever 34 applies a force for pushing the lining 16c of the brake shoe 16 against the inner periphery of the brake drum 14 to the second brake shoe 16 via the contraction position restricting strut 24. When the parking brake lever 34 is further rotated and driven counterclockwise in FIG. 1 successively, the parking brake lever 34 rotates using the engagement point between the contraction position restricting strut 24 and the first engagement portion 27a as the fulcrum, and the first brake shoe 16 expands via the pin 35 and the lining 15c of the first brake shoe 15 is pushed against the inner periphery of the brake drum 14. That is, the parking brake lever 34 moves to the operating position at which the linings 15c and 16c of the first and second brake shoes 15 and 16 are pushed against the inner periphery of the brake drum 14 and the parking brake state can be obtained in this state.

When application of a rotary driving force to the parking brake lever 34 is stopped, the parking brake lever 34 returns to a non-operation position together with the first and second brake shoes 15 and 16 operated by a spring force of the return spring 19 in a direction away from the inner periphery of the brake drum 14, and the parking brake lever 34 is biased toward the non-operation position.

The parking brake lever 34 is rotated and driven by the power generated by an electric actuator 36, and a brake cable 37 to be pulled by the electric actuator 36 is linked to the lower portion of the parking brake lever 34 so that the parking brake state can be obtained by rotating and driving the parking brake lever 34 so as to push the contraction position restricting strut 24 against the web 15a of the second brake shoe 15 by pulling the brake cable 37.

Figure 4:
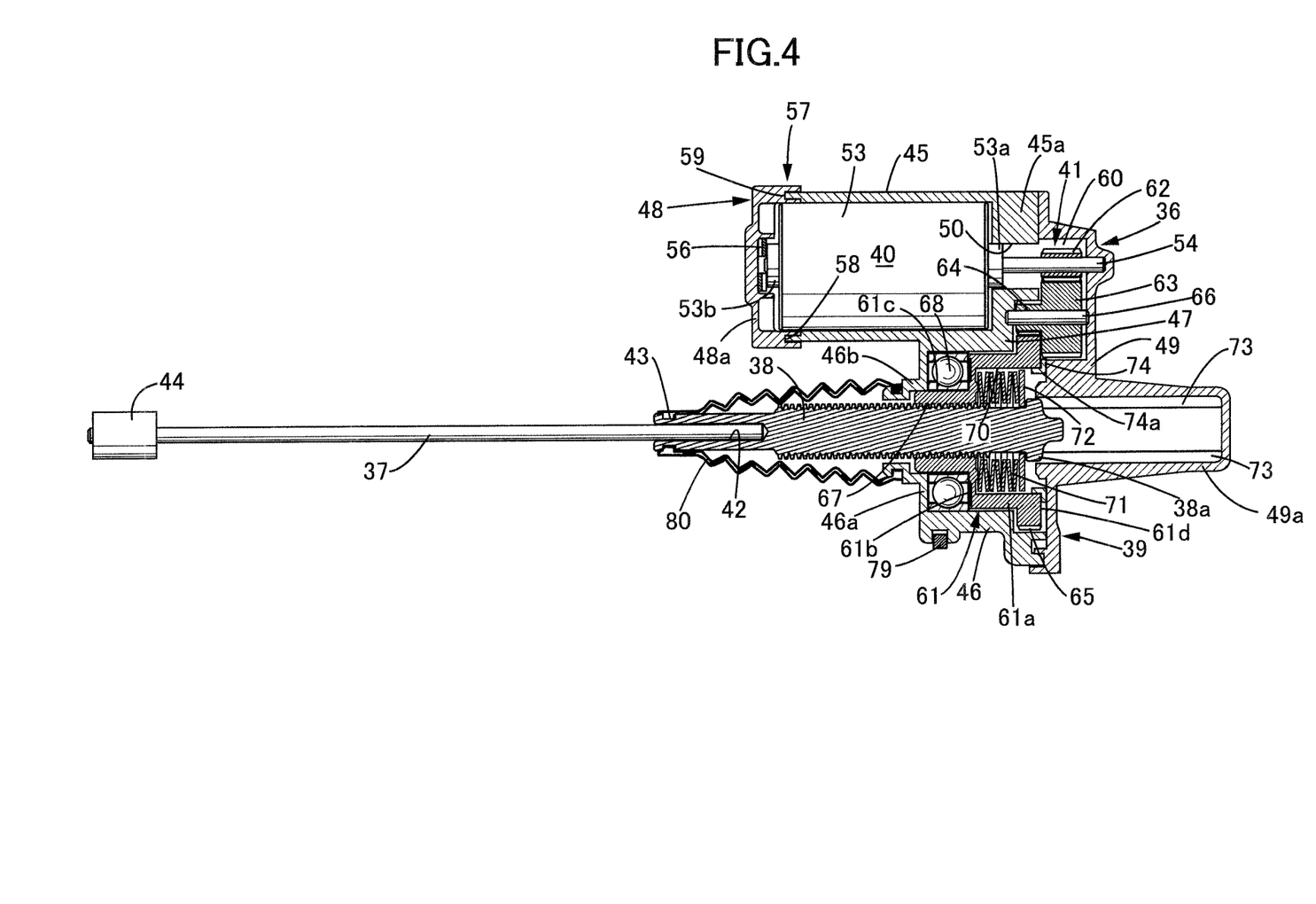
FIG. 4 is a cross-sectional view taken along line 4-4 in FIG. 3 in the state in which a brake cable is released (first embodiment).
Figure 5:
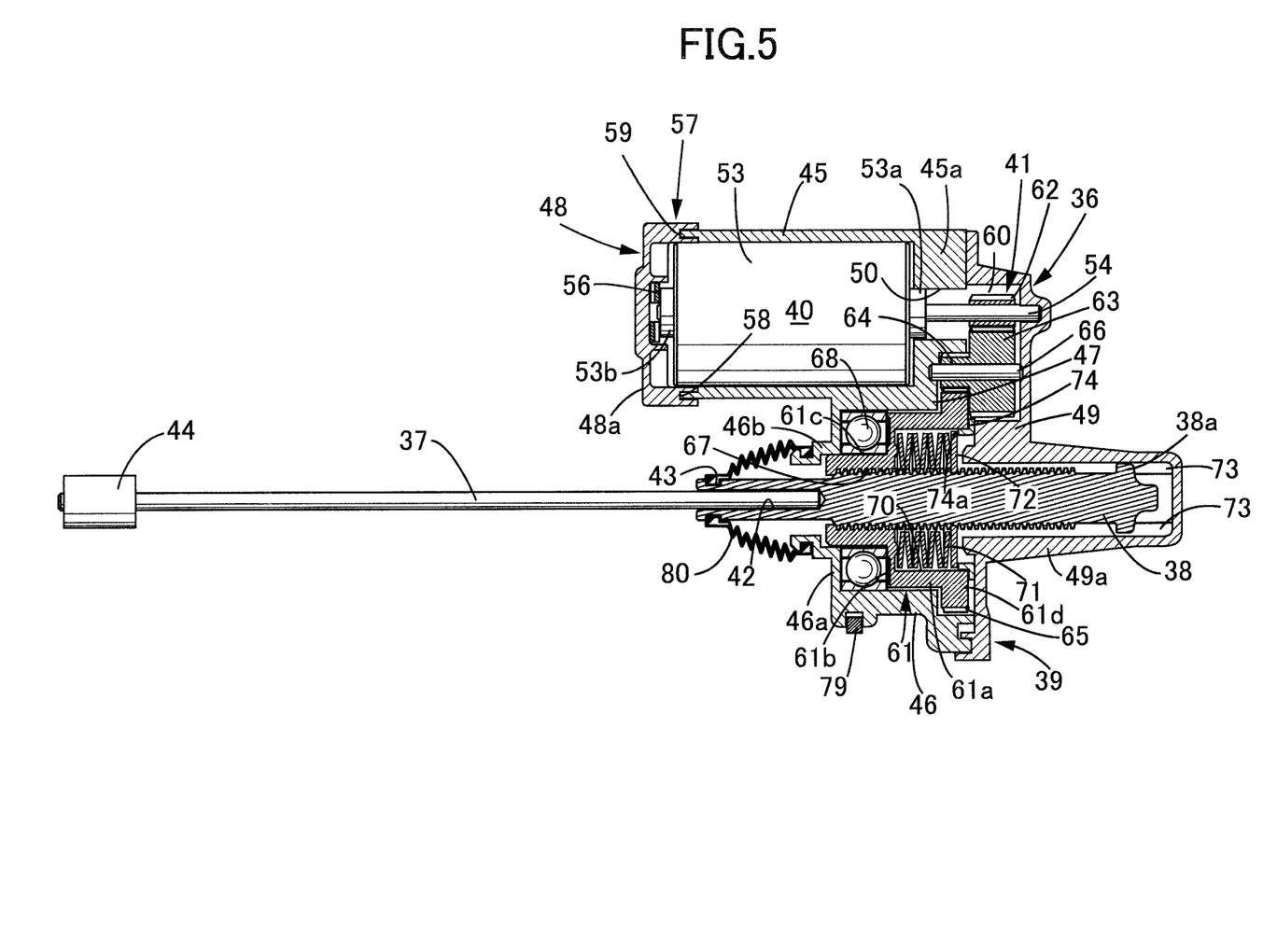
FIG. 5 is a cross-sectional view corresponding to FIG. 4 in the state in which the brake cable is pulled (first embodiment).

With reference to FIGS. 4 and 5 together, the electric actuator 36 includes a screw shaft 38 linked to the brake cable 37, an actuator case 39 that supports the screw shaft 38 to allow reciprocal motion in the axial line direction while preventing rotation, an electric motor 40, supported by the actuator case 39, that can rotate forward and backward, and a motion conversion mechanism 41, provided between the electric motor 40 and the screw shaft 38 in the actuator case 39, that can convert rotary motion generated by the electric motor 40 to linear motion of the screw shaft 38.

The end of the screw shaft 38 close to the brake cable 37 has a bottomed link hole 42 concentrically with the screw shaft 38 and the end of the brake cable 37 close to the electric actuator 36 is inserted into the link hole 42. Furthermore, an annular groove 43 is formed in the outer periphery of the portion of the screw shaft 38 close to the opening end of the portion of the link hole 42, and the screw shaft 38 is linked to the brake cable 37 by swaging the annular groove 43 so that a part of the screw shaft 38 digs into the brake cable 37 in the state in which the brake cable 37 is inserted into the link hole 42.

The brake cable 37 is drawn from the electric actuator 36 mounted to the back plate 13 into the back plate 13, and an engagement piece 44 fixed to the other end of the brake cable 37 is engaged with the lower end of the parking brake lever 34.

The electric actuator 36 switches the state in which the screw shaft 38 is moved so as to pull the brake cable 37 to drive the parking brake lever 34 toward the operation position as illustrated in FIG. 5 and the state in which the screw shaft 38 is moved so as to release the brake cable 37 to return the parking brake lever 34 to the non-operation position from the operation position as illustrated in FIG. 4 by changing the rotation direction of the electric motor 40.

Figure 2:
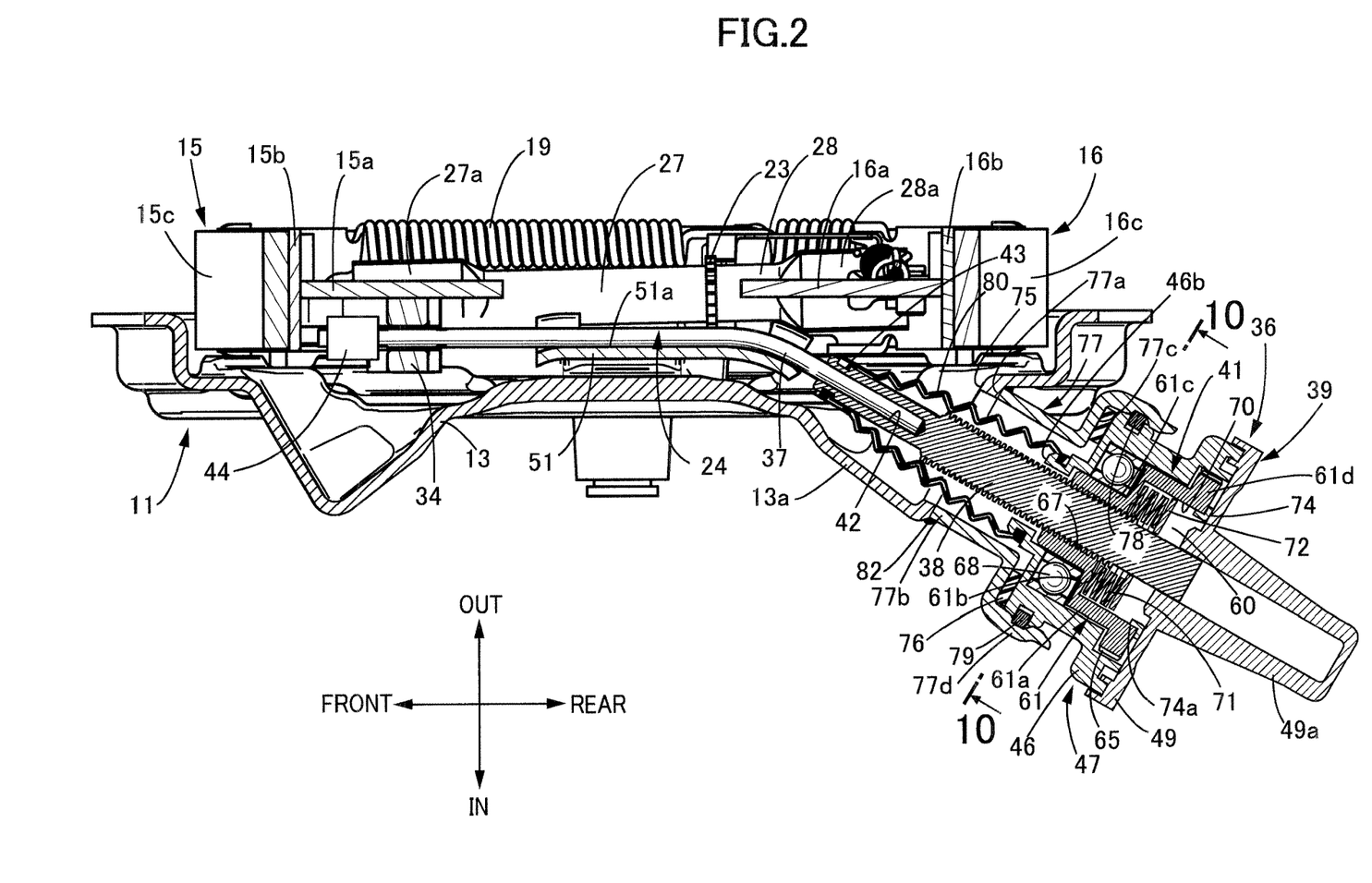
FIG. 2 is a cross-sectional view taken along line 2-2 in FIG. 1 (first embodiment).
Figure 3:
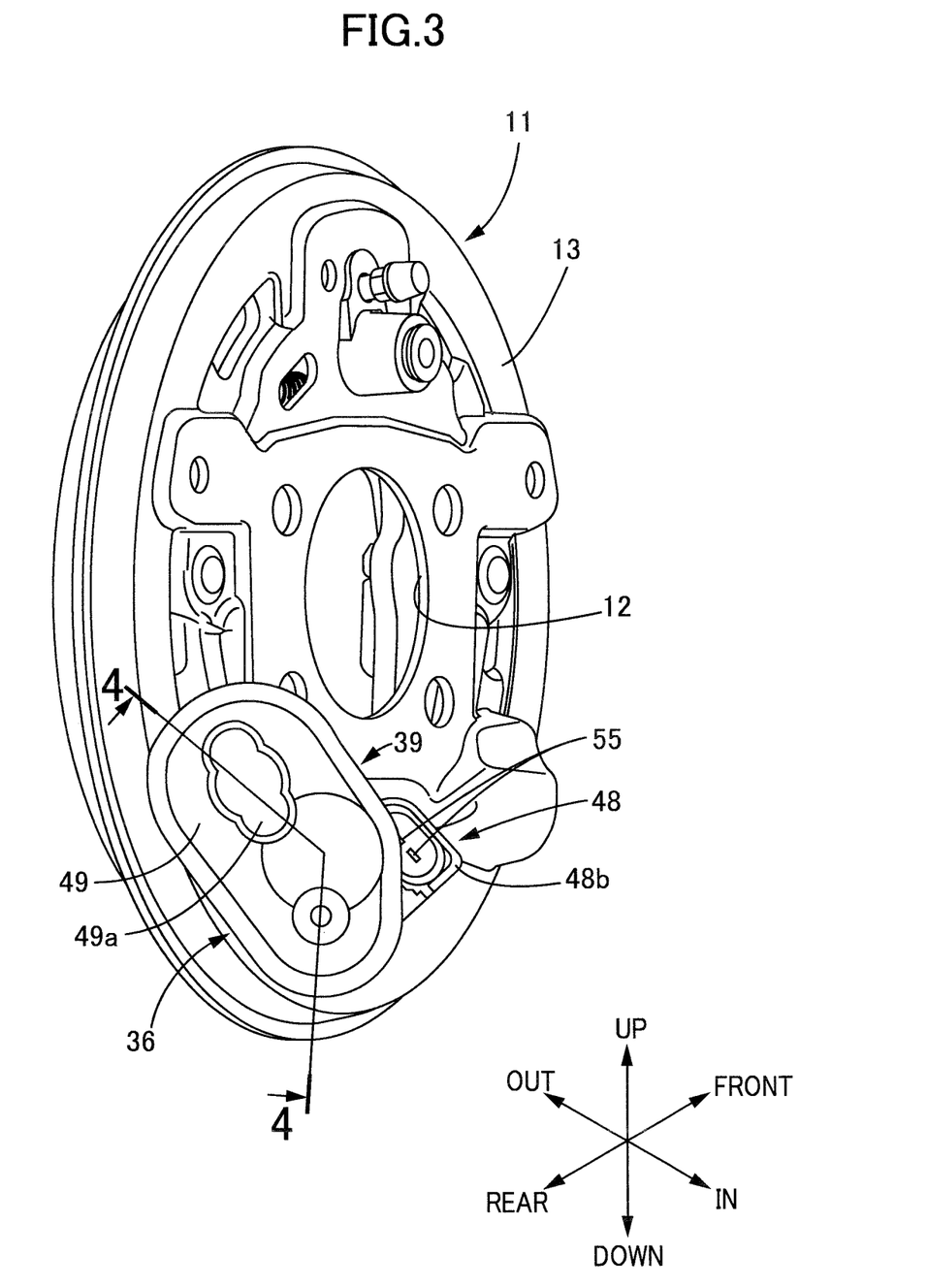
FIG. 3 is a perspective view seen along arrow 3 in FIG. 1 (first embodiment).

A cable guide 51 that sandwiches the anchor block 21 between the cable guide 51 and the lower portion of the back plate 13 is mounted to the lower portion of the back plate 13 via a pair of rivets 52. A guide portion 51a that guides the brake cable 37 is provided integrally with the cable guide 51 so as to have a substantially U-shaped cross section as illustrated in FIG. 2.

Figure 6:
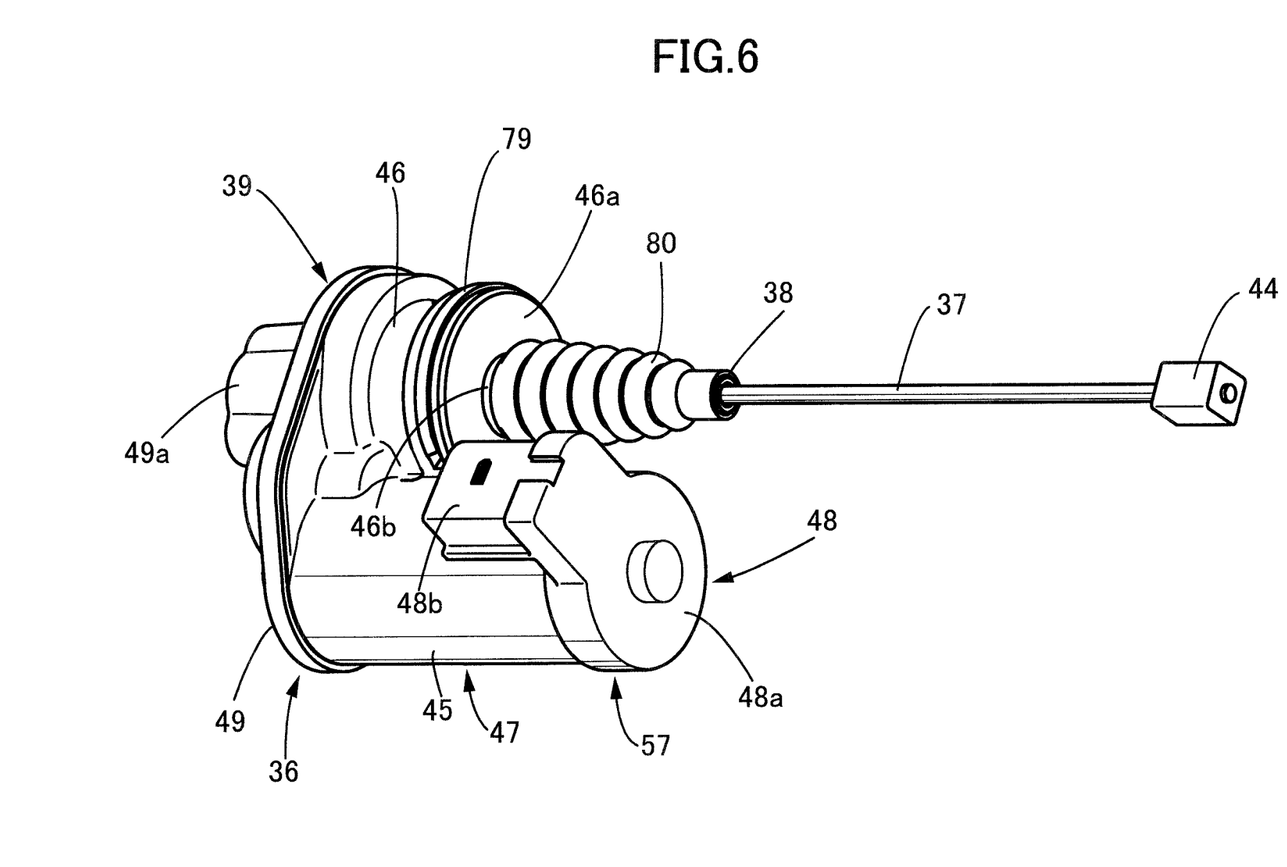
FIG. 6 is a perspective view illustrating an electric actuator (first embodiment).

With reference to FIG. 6 together, the actuator case 39 includes a case main body 47 that integrally has cylindrical first and second tube portions 45 and 46, a first cover member 48 coupled to the opening end of the first tube portion 45, and a second cover member 49 coupled to the case main body 47 from the opposite side of the first cover member 48.

The first tube portion 45 is formed like a bottomed cylinder so that a first end wall portion 45a is provided at one end thereof and a fitting hole 50 is concentrically formed at the center of the first end wall portion 45a. The second tube portion 46 is disposed on the side of the first tube portion 45 and formed like a bottomed cylinder having one end opened and the other end closed by a second end wall portion 46a disposed in the middle portion in the longitudinal direction of the first tube portion 45. At the center of the second end wall portion 46a, a support tube portion 46b with a diameter smaller than in the second tube portion 46 protrudes integrally with the second end wall portion 46a so that the screw shaft 38 passes through the support tube portion 46b.

A cylindrical first bearing portion 53a that rotatably supports a motor shaft 54 protrudes at one end in the axial direction of a motor case 53 of the electric motor 40, one end of the motor shaft 54 passes through the first bearing portion 53a and protrudes from the one end of the motor case 53, and a bottomed cylindrical second bearing portion 53b that rotatably supports the other end of the motor shaft 54 protrudes at the other end in the axial direction of the motor case 53.

This electric motor 40 is accommodated in the first tube portion 45 by bringing one end of the motor case 53 into contact with the first end wall portion 45a while fitting the first bearing portion 53a to the fitting hole 50 of the case main body 47, and the electric motor 40 is accommodated in the first tube portion 45 so that the other end of the motor case 53 at which the second bearing portion 53b is provided faces the outside.

The first cover member 48 integrally has a lid portion 48a that covers the portion of the electric motor 40, accommodated in the first tube portion 45, that faces the outside from the first tube portion 45 and is coupled to the opening end of the first tube portion 45 and a connector portion 48b, disposed on the side of the first tube portion 45, that overhands to the side from the lid portion 48a so that a terminal 55 (see FIG. 3) to be connected to the electric motor 40 is provided. A wave washer 56 is provided between the lid portion 48a and the second bearing portion 53b of the electric motor 40.

Furthermore, the first cover member 48 is coupled to the first tube portion 45 so that at least a plurality of relative circumferential positions (about the axial line of the first tube portion 45) of the connector portion 48b with respect to the first tube portion 45 can be selected arbitrarily and a coupling portion 57 between the first tube portion 45 and the lid portion 48a is coupled via bonding or welding so as to have a circular or regular-polygonal cross-sectional shape.

The lid portion 48a is formed like a dish opened toward the first tube portion 45 and an annular recess 58, concentrically with the first tube portion 45, that has a circular cross-sectional shape is formed at the opening end of the lid portion 48a. In contrast, an annular fitting protruding part 59 to be fitted to the annular recess 58 protrudes at the opening end of the first tube portion 45, and the coupling portion 57 is formed by bonding the lid portion 48a and the first tube portion 45 to each other in the state in which the fitting protruding part 59 is fitted to the annular recess 58 and has a circular cross-sectional shape.

The second cover member 49 is coupled to the case main body 47 so as to forma gear chamber 60 between the second cover member 49 and the case main body 47. In this coupling, the second cover member 49 may be coupled to the case main body 47 via bonding or welding.

The motion conversion mechanism 41 includes a driving gear 62 provided on the motor shaft 54 of the electric motor 40, an intermediate large-diameter gear 63 to be engaged with the driving gear 62, an intermediate small-diameter gear 64 that rotates together with the intermediate large-diameter gear 63, a nut 61 screwed with the screw shaft 38, and a driven gear 65, provided in the nut 61, that is engaged with the intermediate small-diameter gear 64, and is accommodated in the gear chamber 60.

The intermediate large-diameter gear 63 and the intermediate small-diameter gear 64 are formed integrally with each other and rotatably supported by a support shaft 66 in parallel with the motor shaft 54 and the screw shaft 38. In addition, the both ends of the support shaft 66 are supported by the case main body 47 and the second cover member 49.

The nut 61 is formed so as to integrally have a large-diameter cylindrical part 61a rotatably accommodated in the second tube portion 46, an inward collar portion 61b that overhands in a radially inner direction from the end of the large-diameter cylindrical part 61a opposite to the second cover member 49, a small-diameter cylindrical part 61c that extends to the opposite side of the second cover member 49 so as to be continuous to the inner peripheral edge of this inward collar portion 61b and through which the screw shaft 38 passes, and an outward collar portion 61d that overhangs in a radially outer direction from the end of the large-diameter cylindrical part 61a close to the second cover member 49. A female screw 67 to be screwed with the screw shaft 38 is inscribed in the inner periphery of the small-diameter cylindrical part 61c and the driven gear 65 is formed on the outer periphery of the outward collar portion 61d. In addition, a ball bearing 68 is provided between the small-diameter cylindrical part 61c and the end of the second tube portion 46 close to the second end wall portion 46a.

A flange portion 38a that protrudes in a radially outer direction is provided at the end of the screw shaft 38 opposite to the brake cable 37. In contrast, a recess 70 defined by the large diameter cylindrical part 61a and the inward collar portion 61b of the nut 61 is formed in the nut 61 so as to be opened toward the flange portion 38a.

In the screw shaft 38, when the brake cable 37 is pulled to drive the parking brake lever 34 toward the operation position, the flange portion 38a moves away from the nut 61 as illustrated in FIG. 5. When the brake cable 37 is released to return the parking brake lever 34 from the operation position to the non-operation position, the flange portion 38a moves close to the nut 61 as illustrated in FIG. 4. A plurality of disc springs 71 that are present between the flange portion 38a and the nut 61 and generate an elastic force for biasing the flange portion 38a away from the nut 61 when the screw shaft 38 moves so as to release the brake cable 37 are accommodated in the recess 70.

The recess 70 accommodates the plurality of disc springs 71 and a discoid retainer 72 that sandwiches the disc springs 71 between the discoid retainer 72 and the inward collar portion 61b of the nut 61.

The flange portion 38a is formed along the diameter line of the screw shaft 38 so as to protrude in both radially outer directions from the screw shaft 38. On the other hand, a guide tube portion 49a like a bottomed cylinder that surrounds the screw shaft 38 is formed integrally with the second cover member 49 of the actuator case 39 and the inner surface of the guide tube portion 49a is provided with a pair of locking grooves 73 that extend in the direction along the axial line of the screw shaft 38 and are slidably engaged with the flange portion 38a.

A bearing member 74 that receives a thrust force from the nut 61 is provided between the opening end of the guide tube portion 49a and the nut 61 and this bearing member 74 integrally has a short cylindrical portion 74a to be inserted into the recess 70.

When the brake cable 37 is pulled to drive the parking brake lever 34 from the non-operation position toward the operation position as illustrated in FIG. 5, the outer peripheral portion of the retainer 72 makes contact with the short cylindrical portion 74a of the bearing member 74, thereby preventing the disc springs 71 from being removed from the recess 70. In addition, as illustrated in FIG. 4, when the screw shaft 38 moves so as to release the brake cable 37, an elastic force of the disc springs 71 is applied to the flange portion 38a via the retainer 72.

Figure 7:
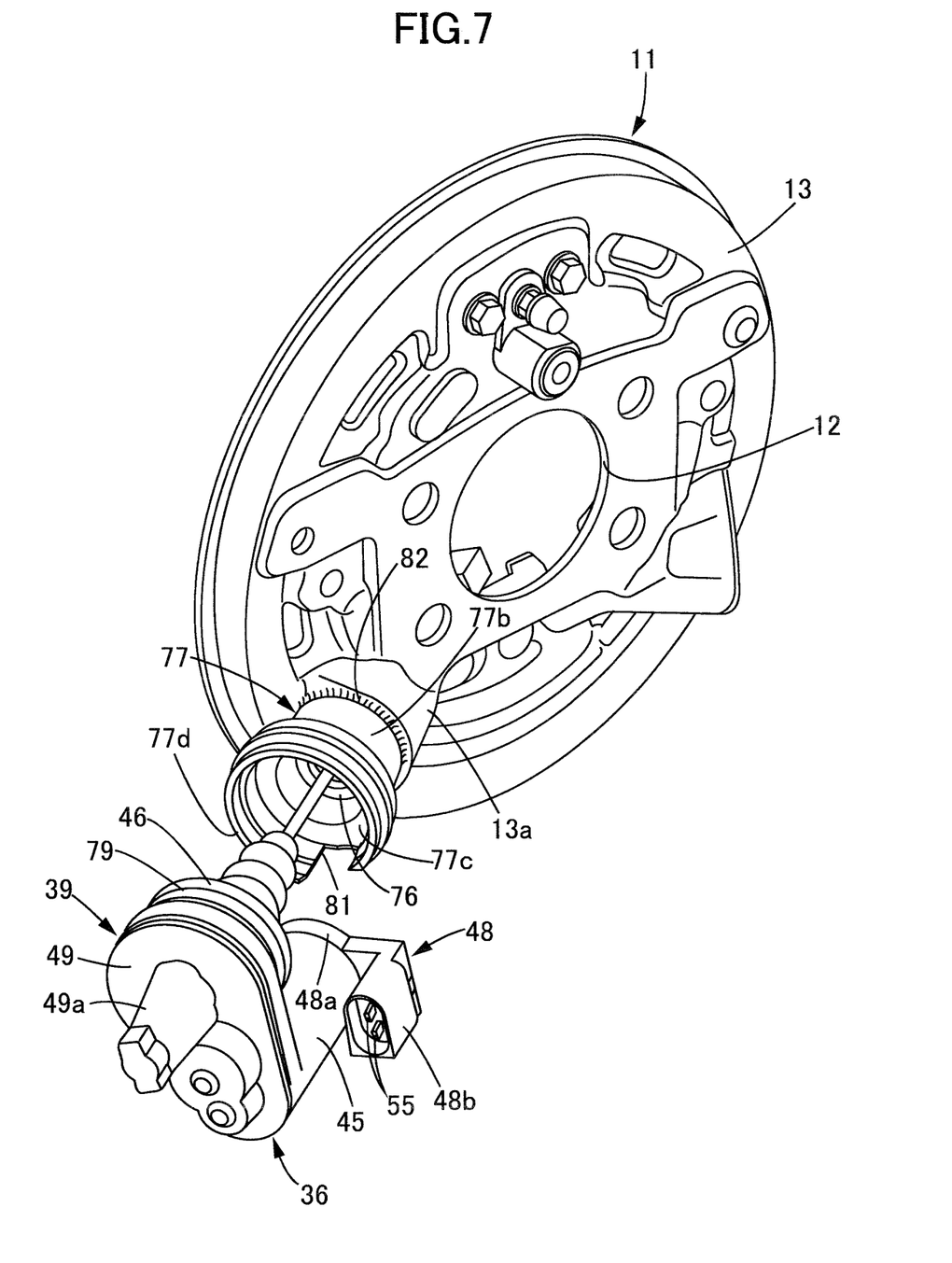
FIG. 7 is an exploded perspective view illustrating the drum brake and the electric actuator (first embodiment).
Figure 8:
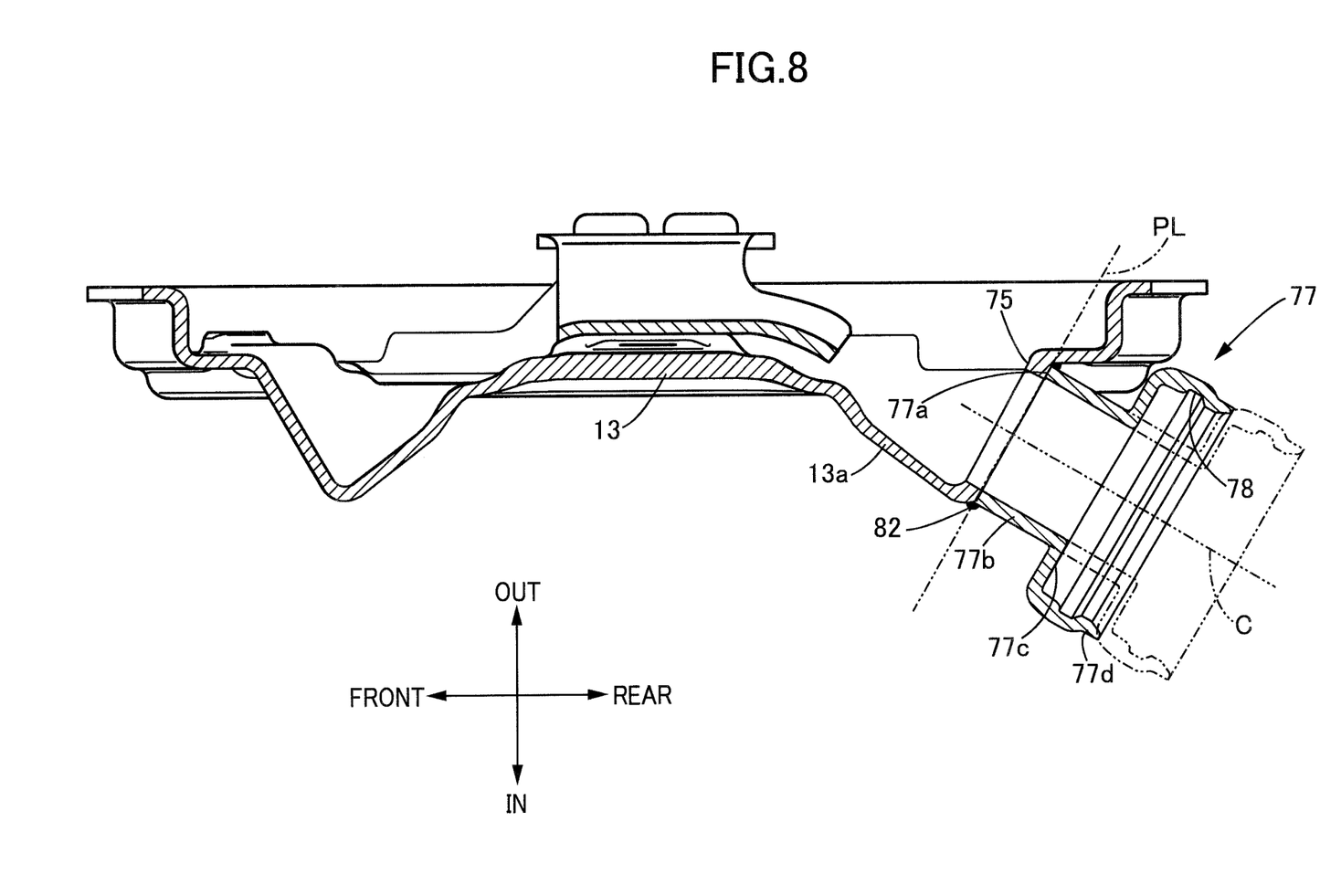
FIG. 8 is a vertical cross-sectional view illustrating a back plate and a mounting tube in the state in which a mounting tube is joined to a connecting tube portion (first embodiment).
Figure 9:
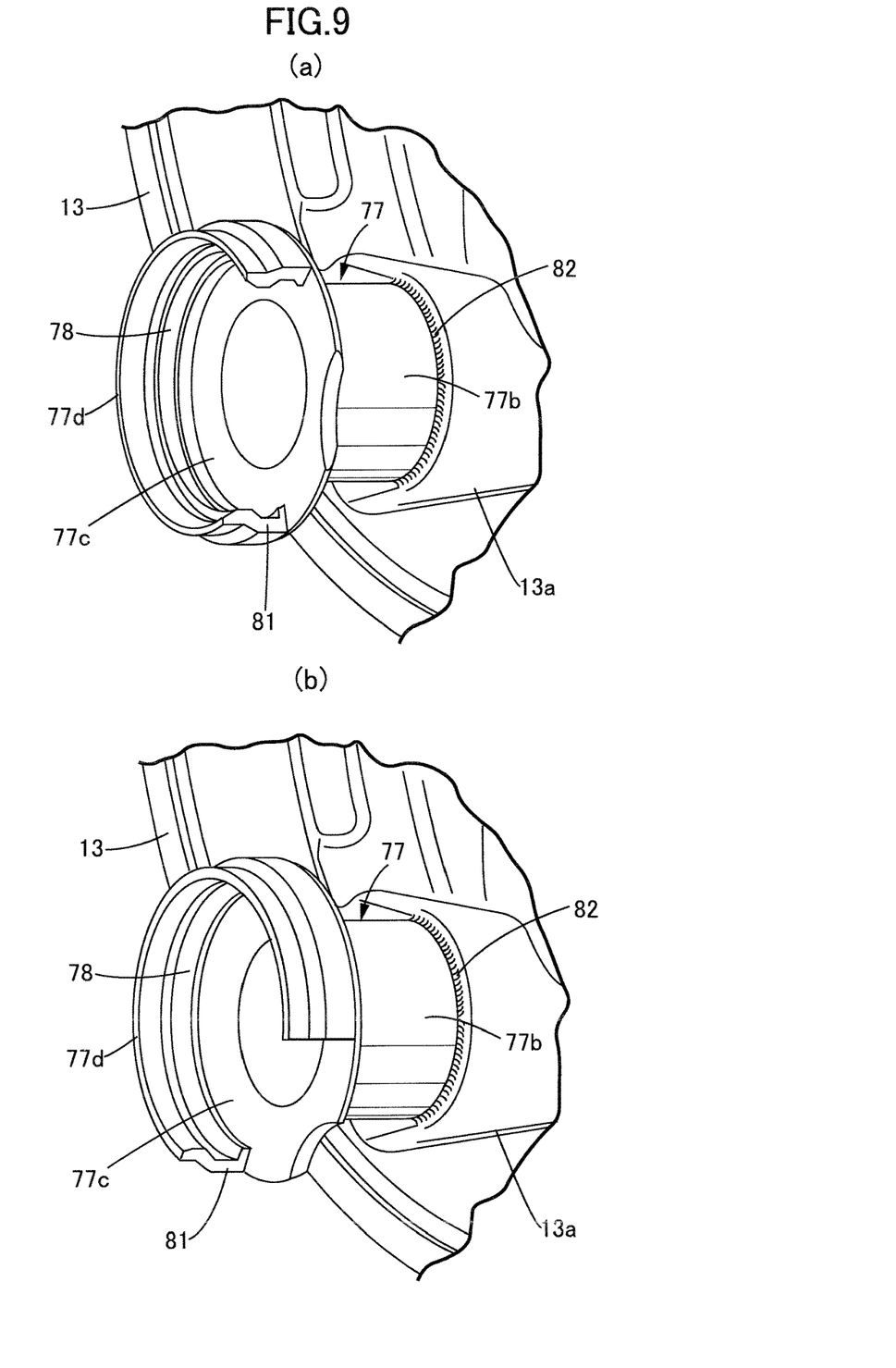
FIG. 9 is a perspective view illustrating the joint attitude of the back plate with respect to the connecting tube portion in which the joint attitude is different between (a) and (b) (first embodiment).

With reference to FIGS. 7 and 9 together, the back plate 13 of the drum brake 11 mounted to the left rear wheel is provided with a through-hole 75 (see FIGS. 2 and 8) through which the brake cable 37 passes, and a connecting tube portion 13a that surrounds the through-hole 75 protrudes integrally so as to be opened backward and inward in the vehicle width direction. On the other hand, the actuator case 39 of the electric actuator 36 is mounted to a mounting tube 77 formed separately from the back plate 13 at certain axial and circumferential positions with respect to the mounting tube 77. In addition, a joint portion 77a (see FIGS. 2 and 8) provided at one end in the axial direction of the mounting tube 77 is joined to the connecting tube portion 13a. In the embodiment, the joint portion 77a of the mounting tube 77 is welded to the connecting tube portion 13a in a welded portion 82.

The mounting tube 77 is formed so as to integrally have, sequentially from one end close to the connecting tube portion 13a, a small-diameter tube portion 77b having the joint portion 77a at one end thereof and a large-diameter tube portion 77d that has one end concentrically continuous to the other end of the small-diameter tube portion 77b with an annular step portion 77c disposed between the large-diameter tube portion 77d and the small-diameter tube portion 77b and the other end opened backward and inward in the vehicle width direction, in which the joint portion 77a is formed along a plane orthogonal to the axial line of the mounting tube 77.

The case main body 47 of the actuator case 39 is mounted to the mounting tube 77 at certain axial and circumferential positions, and the second tube portion 46 of the case main body 47 is inserted into the large-diameter tube portion 77d with an annular elastic member 76 made of an elastic material such as rubber provided between the second tube portion 46 and the step portion 77c of the mounting tube 77 and engaged with the mounting tube 77 so as to be prevented from moving in the axial direction.

Figure 10:
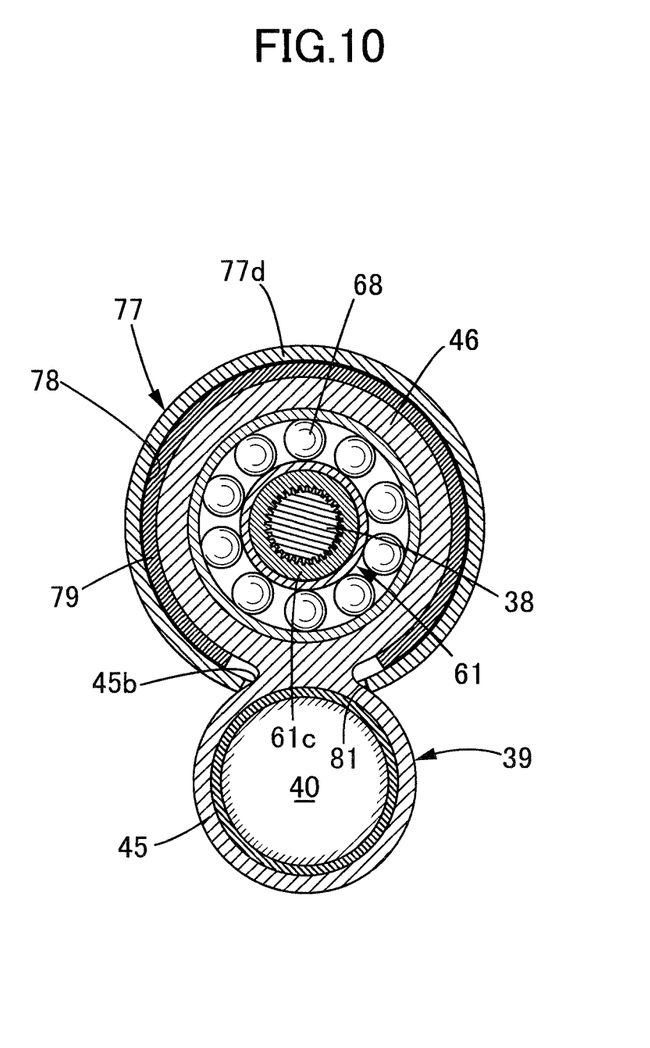
FIG. 10 is a cross-sectional view taken along line 10-10 in FIG. 2 (first embodiment).

With reference to FIG. 10 together, to prevent the second tube portion 46 inserted into the mounting tube 77 from moving in the axial direction, an annular locking groove 78 is formed in the inner periphery of the large-diameter tube portion 77d of the mounting tube 77 and a C-shaped retaining ring 79 is mounted onto the outer periphery of the second tube portion 46 of the case main body 47. When the retaining ring 79 is elastically engaged with the locking groove 78, the second tube portion 46 of the case main body 47 of the actuator case 39 is prevented from moving in the axial direction by the large-diameter tube portion 77d of the mounting tube 77.

Furthermore, a locking recess 81 is formed in, for example, one position about the center axial line of the mounting tube 77 in the step portion 77c and the large-diameter tube portion 77d of one (the mounting tube 77 in the embodiment) of the mounting tube 77 and the case main body 47. In the embodiment, the locking recess 81 is formed so as to pass through the inner surface and the outer surface of the peripheral wall of the large-diameter tube portion 77d by cutting a part in the circumferential direction of the large-diameter tube portion 77d so that a part of the locking recess 81 reaches the step portion 77c. In contrast, an engagement portion 45b to be engaged with the locking recess 81 is formed in the other of the mounting tube 77 and the case main body 47. In the embodiment, apart of the peripheral wall of the first tube portion 45 of the case main body 47 close to the second tube portion 46 functions as the engagement portion 45b.

By mounting the actuator case 39 to the mounting tube 77 of the back plate 13 and joining the mounting tube 77 to the connecting tube portion 13a of the back plate 13 via, for example, welding, as described above, the actuator case 39 is mounted to the rear portion in the vehicle front-rear direction of the back plate 13 and the connector portion 48b faces backward in the vehicle front-rear direction. In addition, a bellows boot 80 that covers a protrusion of the screw shaft 38 from the second tube portion 46 is provided between the outer periphery of the support tube portion 46b of the second tube portion 46 and the outer periphery of one end of the screw shaft 38.

Next, an operation of the first embodiment will be described. The drum brake 11 can obtain a parking brake state by pulling the brake cable 37 linked to the parking brake lever 34 using the electric actuator 36, and the electric actuator 36 successfully controls the operation and release of the parking brake.

In addition, the electric actuator 36 includes the screw shaft 38 linked to the brake cable 37 continuous to the parking brake lever 34 biased toward the non-operation position, the actuator case 39 that supports the screw shaft 38 reciprocally in the axial line direction while preventing rotation, the electric motor 40 supported by the actuator case 39 rotatably forward and backward, and the motion conversion mechanism 41 that has the nut 61 to be screwed with the screw shaft 38 as one component, can convert a rotary motion generated by the electric motor 40 to a linear motion of the screw shaft 38, and is disposed between the electric motor 40 and the screw shaft 38 in the actuator case 39. It is possible to switch the state in which the brake cable 37 is pulled to drive the parking brake lever 34 toward the operation position and the state in which the brake cable 37 is released to return the parking brake lever 34 toward the non-operation position from the operation position by changing the rotational direction of the electric motor 40, the screw shaft 38 is provided with the flange portion 38a that protrudes in a radially outer direction, the recess 70 opened toward the flange portion 38a is formed concentrically with the nut 61, and the disc springs 71, provided between the flange portion 38a and the nut 61, that generate an elastic force for biasing the flange portion 38a away from the nut 61 when the screw shaft 38 is moved so as to release the brake cable 37 is accommodated in the recess 70.

Accordingly, the elastic force of the disc springs 71 is applied to the screw shaft 38 when the elastic force moves the screw shaft 38 so as to release the brake cable 37, thereby enabling application of a load to the electric motor 40 during return operation. Furthermore, since the disc springs 71 are accommodated in the recess 70 formed in the nut 61 concentrically with the screw shaft 38, an additional space for disposing the disc springs 71 is not required, the size of the actuator case 39 can be reduced. In addition, since the elastic force of the disc springs 71 is applied to the actuator case 39 only when the parking brake is applied, the strength of the actuator case 39 does not need to be increased more than necessary.

In addition, since the plurality of stacked disc springs 71 are accommodated in the recess 70, the elastic load can be changed by selecting the number of the disc springs 71 and the specification can be easily changed depending on the type of the electric actuator 36.

In addition, since the flange portion 38a protrudes in both radially outer directions from the screw shaft 38 along one diameter line of the screw shaft 38 and the actuator case 39 is provided with the pair of locking grooves 73 that extend along the axial line of the screw shaft 38 and are slidably engaged with the flange portion 38a, it is possible to prevent the screw shaft 38 from rotating while allowing the screw shaft 38 to move in the axial line direction, thereby simplifying the structure for preventing the screw shaft 38 from rotating.

In addition, since the actuator case 39 of the electric actuator 36 includes the case main body 47 having the first tube portion 45 that accommodates the electric motor 40 that generates power for obtaining the parking brake state so that a part of the electric motor 40 faces the outside and the first cover member 48 integrally having the lid portion 48a that covers the part of the electric motor 4 and is coupled to the first tube portion 45 and the connector portion 48b that overhands to the side from the lid portion 48a and disposed on the side of the first tube portion 45 so that the terminal 55 to be connected to the electric motor 40 is disposed. Since the first cover member 48 is coupled to the first tube portion 45 so that at least a plurality of relative circumferential positions of the connector portion 48b with respect to the first tube portion 45 can be arbitrarily selected, versatility can be provided because the position of the connector portion 48b with respect to the actuator case 39 can be easily changed without the necessity to create the actuator case 39 according to the layout of each vehicle type and an increase in cost can be suppressed by supporting many types of vehicles.

In addition, since the coupling portion 57 between the first tube portion 45 and the lid portion 48a has a circular or regular-polygonal cross-sectional shape, the freedom of the position of the connector portion 48b with respect to the actuator case 39 is increased and the orientation of the connector portion 48b can be easily changed.

In addition, since the actuator case 39 in which the connector portion 48b faces backward in the vehicle front-rear direction is mounted to the rear portion in the vehicle front-rear direction of the back plate 13 of the drum brake 11 of the rear wheel, the connector portion 48b faces backward in the vehicle front-rear direction, the maintainability of the connector portion 48b installed in a vehicle can be improved, and the connector portion 48b can be protected from a stone flying during a travel of the vehicle.

In addition, since the first cover member 48 is coupled to the first tube portion 45 via bonding or welding, the first cover member 48 can be surely coupled to the first tube portion 45 while the orientation of the connector portion 48b is easily changeable without increasing the number of components in coupling of the first cover member 48 to the first tube portion 45.

In addition, the back plate 13 of the drum brake 11 is provided with the through-hole 75 through which the brake cable 37 passes, the connecting tube portion 13a that surrounds the through-hole 75 protrudes integrally so as to be opened backward and inward in the vehicle width direction, and the actuator case 39 is mounted to the mounting tube 77 having, at one end in the axial direction, the joint portion 77a formed separately from the back plate 13 and joined to the connecting tube portion 13a via, for example, welding at certain axial and circumferential positions with respect to the mounting tube 77. Accordingly, when the joint portion 77*a* is joined to the connecting tube portion 13*a* by changing the relative circumferential position of the mounting tube 77 with respect to the connecting tube portion 13*a* to, for example, the state illustrated in FIG. 9(*a*) or the state illustrated in FIG. 9 (*b*), the mounting attitude of the electric actuator 36 with respect to the back plate 13 can be easily changed. Furthermore, the mounting tube 77 may have a simple shape and variations of the mounting tube 77 for individual vehicle types can be easily deployed by, for example, changing the mounting attitude of the mounting tube 77 with respect to the connecting tube portion 13*a* and the axial length of the mounting tube 77 as indicated by the dot-dot-dash line in FIG. 8 and an increase in cost can be avoided without necessity to prepare the back plate 13 specific to each vehicle type.

Furthermore, the retaining ring 79 mounted onto the outer periphery of the second tube portion 46 of the case main body 47 of the actuator case 39 is elastically engaged with the locking groove 78 formed in the inner periphery of the mounting tube 77 in mounting the actuator case 39 to the mounting tube 77 at a certain axial position, and the engagement portion 45*b* formed in the case main body 47 of the actuator case 39 is engaged with the locking recess 81 formed around the center axial line of the mounting tube 77 and formed in the mounting tube 77 in mounting the actuator case 39 to the mounting tube 77 at a certain circumferential position. Accordingly, the assemblability of the actuator case 39 to the mounting tube 77 can be improved by preventing the actuator case 39 from moving in the axial direction with respect to the mounting tube 77 and the actuator case 39 from rotating with respect to the mounting tube 77 in a simple structure having fewer components.

Second Embodiment

A second embodiment of the invention will be described with reference to FIG. 11, but components corresponding to those in the first embodiment are denoted by the same reference numerals and detailed descriptions are omitted.

The connecting tube portion 13*a* that surrounds the through-hole 75 protrudes integrally with the back plate 13 of the drum brake 11 so as to be opened backward and inward in the vehicle width direction. In addition, a mounting tube 84 is formed separately from the back plate 13 and a joint portion 84*a* provided at one end in the axial direction of this mounting tube 84 is joined to the connecting tube portion 13*a* via, for example, welding in a welded portion 85.

The mounting tube 84 is formed so as to integrally have, sequentially from one end close to the connecting tube portion 13*a*, a small-diameter tube portion 84*b* having the joint portion 84*a* at one end thereof and a large-diameter tube portion 84*d* that has one end concentrically continuous to the other end of the small-diameter tube portion 84*b* with an annular step portion 84*c* disposed between the large-diameter tube portion 84*d* and the small-diameter tube portion 84*b* and the other end opened backward and inward in the vehicle width direction, in which the joint portion 84*a* is formed along a plane PL that obliquely intersects with an axial line C of the mounting tube 84.

The case main body 47 (see the first embodiment) of the actuator case 39 of the electric actuator 36 is mounted to the mounting tube 84 as in the first embodiment and the annular locking groove 78 is formed in the inner surface of the large-diameter tube portion 84*d* of the mounting tube 84.

Figure 11:
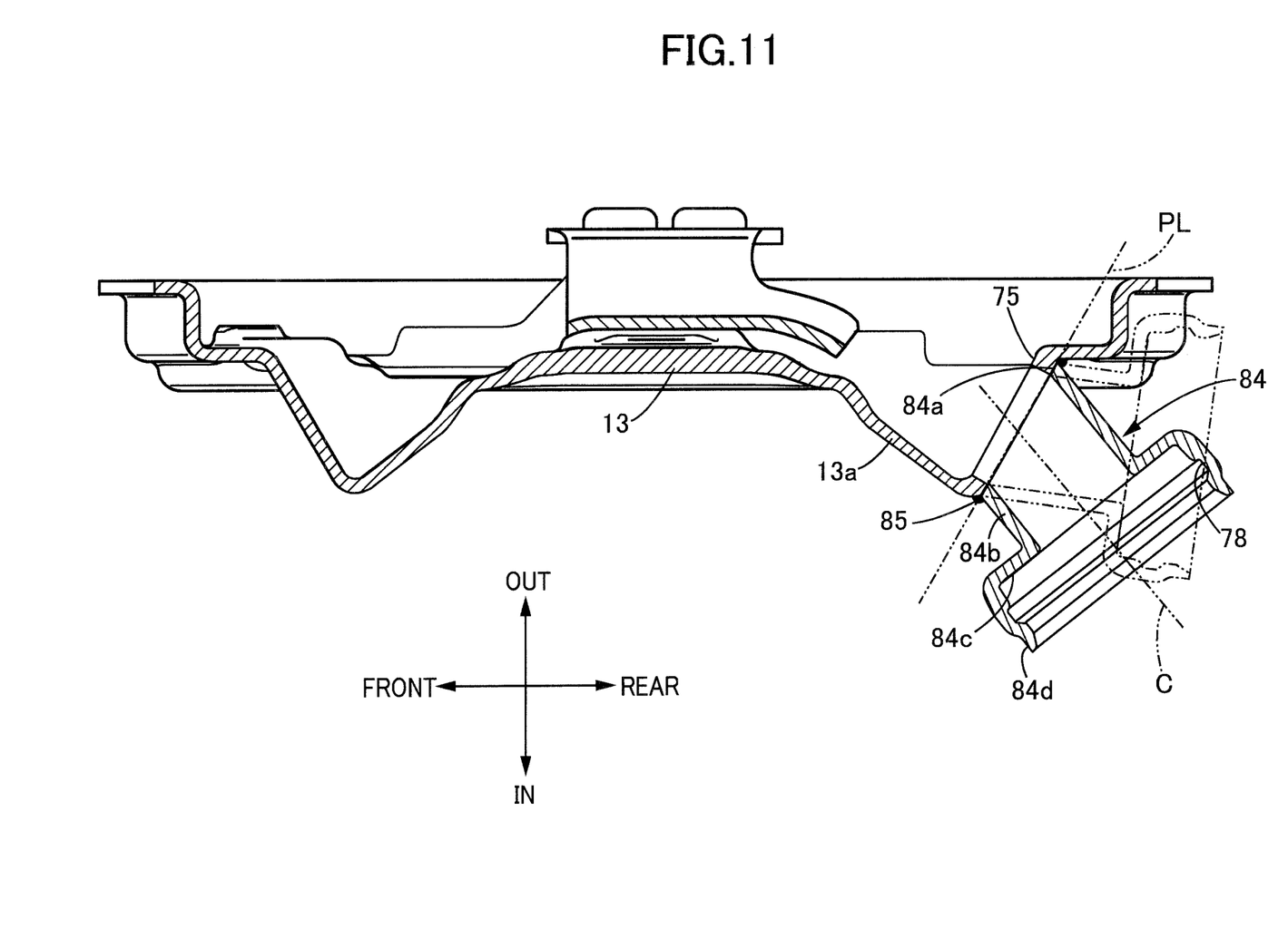
FIG. 11 is a vertical cross-sectional view illustrating a second embodiment and corresponds to FIG. 8 (second embodiment).

Since the joint portion 84*a* is formed along the plane PL that obliquely intersects with the axial line C of the mounting tube 84 in the second embodiment, the axial line of the mounting tube 84 can be aligned with the direction obliquely intersecting with the connecting tube portion 13*a*, the mounting direction of the electric actuator 36 with respect to the back plate 13 can be easily changed to a direction that differs from the direction in the first embodiment, the direction in which the mounting tube 84 extends from the connecting tube portion 13*a* can be freely changed (for example, 180 degrees) as illustrated by the dot-dot-dash line in FIG. 11, and the freedom of the mounting attitude of the electric actuator 36 with respect to the back plate 13 can be further increased.

Although embodiments of the invention have been described above, the invention is not limited to the above embodiments and various design changes can be made without departing from the spirit of the invention.

For example, although the mounting tube 77 or 84 is joined to the connecting tube portion 13*a* via welding in the embodiments described above, the mounting tube 77 or 84 may be joined to the connecting tube portion 13*a* by friction welding or bonding with an adhesive.

In addition, although the movement of the case main body 47 in the axial direction with respect to the mounting tube 77 or 84 is prevented by elastically engaging the retaining ring 79 mounted to the case main body 47 of the actuator case 39 to the locking groove 78 of the mounting tube 77 or 84 and the movement of the case main body 47 in the circumferential direction with respect to the mounting tube 77 or 84 is prevented by engaging the engagement portion 45*b* of the case main body 47 with the locking recess 81 formed in the mounting tube 77 or 84 in the embodiments described above, the invention is also applicable to the structure in which the actuator case 39 is fastened to the mounting tube 77 or 84.

The invention claimed is:

1. An electric parking brake device in which an actuator case of an electric actuator capable of obtaining a parking brake state by pulling a brake cable linked to a parking brake lever is mounted to a back plate of a drum brake having the parking brake lever, wherein:
   a through-hole through which the brake cable passes is formed in the back plate,
   a connecting tube portion that surrounds the through-hole protrudes integrally from the back plate,
   the actuator case is mounted to a mounting tube at certain axial and circumferential positions with respect to the mounting tube, the mounting tube having, at one end in an axial direction, a joint portion formed separately from the back plate, the joint portion joined to the connecting tube portion such that a relative circumferential position of the mounting tube with respect to the connecting tube portion can be selected,
   and wherein the mounting tube comprises, in a mentioned order from one end of the connecting tube portion,
   a small-diameter tube portion having the joint portion at the one end of the mounting tube,
   an annular step portion,
   and a large-diameter tube portion that is formed coaxially and integrally with the small-diameter tube portion via the annular step portion disposed therebetween, the large-diameter tube portion having an open end,
   wherein the actuator case is inserted into and engaged with the large-diameter portion from the open end, a locking recess is formed in at least one position of the mounting tube, the locking recess is formed by cutting a part in the circumferential direction of the large-diameter tube portion, and the locking recess is formed so as to pass through an inner surface and an outer surface of a peripheral wall of the large-diameter tube portion.

2. The electric parking brake device according to claim 1, wherein the actuator case comprises a case main body that has first and second cylindrical tube portions operatively attached to one another, a first cover member coupled to a first side of the case main body at an opening end of the first tube portion, and a second cover member coupled to a second side of the case main body opposite the first side thereof.

3. The electric parking brake device according to claim 1, wherein the joint portion is formed along a plane that obliquely intersects with an axial line of the mounting tube.

4. The electric parking brake device according to claim 3, wherein:
the locking recess is formed in the step portion and the large-diameter tube portion of the mounting tube.

5. The electric parking brake device according to claim 4, wherein:
the mounting tube nestingly receives a portion of the actuator case inside of the large-diameter tube portion,
the large-diameter tube portion of the mounting tube has an annular locking groove formed therein,
and a retaining ring fits into the locking groove to retain the actuator case in engagement with the mounting tube.

6. The electric parking brake device according to claim 1, wherein:
the locking recess is formed in the step portion and the large-diameter tube portion of the mounting tube.

7. The electric parking brake device according to claim 6, wherein:
the mounting tube nestingly receives a portion of the actuator case inside of the large-diameter tube portion,
the large-diameter tube portion of the mounting tube has an annular locking groove formed therein,
and a retaining ring fits into the locking groove to retain the actuator case in engagement with the mounting tube.

8. The electric parking brake device according to claim 6, wherein the locking recess is formed in one position about a center axial line of the mounting tube in the step portion and in the large-diameter tube portion of the mounting tube, wherein an engagement portion is formed as part of the actuator case, and wherein the engagement portion is received in the locking recess.

9. In combination, a brake back plate and an electric parking brake device,
the back plate comprising a main plate body having a through-hole formed therein, and a connecting tube portion that surrounds the through-hole and protrudes integrally from a rear surface of the main plate body,
the electric parking brake device comprising:
an actuator having an actuator case,
a brake cable operatively attached to the actuator, and
a mounting tube disposed between the actuator case and the connecting tube portion, the mounting tube comprising, in a mentioned order from one end of the connecting tube portion, a small-diameter tube portion having a first diameter, an annular step portion, and a large-diameter tube portion which is formed coaxially and integrally with the small-diameter tube and has a second diameter greater than the first diameter, the annular step portion disposed between and interconnecting the large-diameter tube portion and the small-diameter tube portion, wherein the small-diameter portion has a joint portion at one end in an axial direction, and wherein the large-diameter tube portion has an open end, and the actuator case is inserted into and engaged with the large-diameter portion from the open end, and a locking recess is formed in at least one position of the mounting tube, the locking recess is formed by cutting a part in the circumferential direction of the large-diameter tube portion;

the locking recess is formed so as to pass through an inner surface and an outer surface of the peripheral wall of the large-diameter tube portion, and the locking recess is formed so as to pass through an inner surface and an outer surface of a peripheral wall of the large-diameter tube portion.

10. The electric parking brake device according to claim 9, wherein the joint portion is formed along a plane that obliquely intersects with an axial line of the mounting tube.

11. The electric parking brake device according to claim 9, wherein:
the mounting tube nestingly receives a portion of the actuator case inside of the large-diameter tube portion,
the large-diameter tube portion of the mounting tube has an annular locking groove formed therein,
and a retaining ring fits into the locking groove to retain the actuator case in engagement with the mounting tube.

12. The electric parking brake device according to claim 9, wherein the locking recess is formed in one position about a center axial line of the mounting tube in the step portion and in the large-diameter tube portion of the mounting tube, wherein an engagement portion is formed as part of the actuator case, and wherein the engagement portion is received in the locking recess.

13. The electric parking brake device according to claim 9, wherein the actuator case comprises a case main body that has first and second cylindrical tube portions operatively attached to one another, a first cover member coupled to a first side of the case main body at an opening end of the first tube portion, and a second cover member coupled to a second side of the case main body opposite the first side thereof.

14. The electric parking brake device according to claim 13, wherein:
the mounting tube nestingly receives a portion of the actuator case inside of the large-diameter tube portion,
the large-diameter tube portion of the mounting tube has an annular locking groove formed therein,
and a retaining ring fits into the locking groove to retain the actuator case in engagement with the mounting tube.

* * * * *